3,004,936
BUTADIENE COPOLYMER RUBBER-SILICA-PROTEIN MASTERBATCH AND PROCESS OF PREPARATION

Louis H. Howland, Watertown, and Woodrow W. White, Oxford, Conn., assignors to United States Rubber Company, New York, N.Y., a corporation of New Jersey
No Drawing. Filed Aug. 29, 1958, Ser. No. 757,925
13 Claims. (Cl. 260—8)

This invention relates to highly reinforced synthetic rubbers.

For many years attempts have been made to make a white or light colored reinforcing filler for rubber that was equivalent to the carbon black reinforcing action in rubber. Many of these attempts have involved making finely divided silicas by various methods and then milling them into rubber in suitable quantities and making vulcanizates. Also, preformed silicas have been dispersed in water and mixed with a rubber latex and the mixture coagulated to give a silica-rubber masterbatch. Such methods have given far less reinforcement than desired.

In our prior U.S. patent application Serial No. 645,410, filed March 12, 1957, now U.S. Patent No. 2,964,490, there is disclosed the reinforcement of synthetic rubbers containing basic nitrogen functional groups or amino groups, e.g. copolymers of butadienes and copolymerizable monomers containing an amino group such as vinyl pyridines, by mixing an alkali-metal silicate with the alkaline latex and treating the mixture with an acid to coprecipitate the rubber and silica masterbatch. By the present invention, further improved reinforcement is obtained in such basic rubber and silica masterbatches by incorporating in the latex a protein in addition to the alkali-metal silicate before acidification to coprecipitate the rubber and silica masterbatch. We have also found that incorporating alkali-metal silicate and protein in latices of certain non-basic polar rubbers and coprecipitating with acid will give masterbatches with exceptional reinforcing properties, whereas without the protein addition to such latex and alkali-metal silicate mixtures reinforcement of the rubber is not obtained, and the coprecipitated silica acts merely as an inert filler. Such non-basic polar rubbers that are reinforced by the process of the present invention are those containing carbonyl, carbonitrile or chloroaryl groups. Hydrocarbon rubbers such as natural rubber, polybutadiene rubber, and butadiene-styrene copolymer rubbers do not show effective reinforcement by the process of the present invention.

In carrying out the present invention, an alkali-metal silicate and a protein are incorporated in the alkaline latex of a rubber containing amino, carbonyl, carbonitrile or chloroaryl polar groups, and an acid is mixed therewith to produce a final pH of less than 7 in the aqueous medium of the coagulated rubber and the in situ prepared silica, at the completion of the coagulation of the masterbatch, i.e. after addition of the acid. The final pH is generally from 2 to 6.5 and preferably 4 to 6.5. The acid used in reducing the pH during coprecipitation of the silica and rubber may be any of the common mineral acids or organic acids which are capable of reducing the pH of the flocculating mixture to below 7, e.g. sulfuric, hydrochloric, nitric and the acetic acids. The amount of silica will be from 5 to 100 parts per 100 of the rubber, with the preferred range being from 10 to 50 parts of silica per 100 parts of rubber. The protein, which may be a conventional protein such as glue or gelatin or casein will be from 2 to 10 parts per 100 parts of the rubber, with the preferred range being from 3 to 7 parts per 100 parts of rubber.

The alkali-metal silicate which is mixed with the latex may be any of the commercial silicates having varying proportions of sodium or potassium oxide content. For example, "N" brand sodium silicate (Philadelphia Quartz Co.) is sold in the form of an aqueous solution of about 38% solids content, in which ratio $Na_2O:SiO_2$ is about 1:3.2. "RU" brand sodium silicate (Philadelphia Quartz Co.) is sold in the form of a 47% aqueous solution in which the ratio $Na_2O:SiO_2$ is about 1:2.4. "KaSil No. 1" brand potassium silicate (Philadelphia Quartz Co.) is sold in the form of a 27% aqueous solution in which the ratio $K_2O:SiO_2$ is about 1:2.5. Other commercial alkali-metal silicates have ratios of alkali-metal oxide to silicon dioxide of 1:1.6, 1:2.0, 1:2.9, 1:3.75. Various other silicates, such as sodium meta silicate ($Na_2O.SiO_2$) and ordinary water glass ($Na_2O.4SiO_2$) may be used.

The synthetic rubbers to which the present invention is applicable are copolymers of one or more butadienes-1,3, e.g. butadiene-1,3, 2-methyl butadiene-1,3, chloroprene, piperylene and 2,3-dimethyl butadiene-1,3 and one or more copolymerizable compounds which contain a $CH_2=C<$ group and in at least one such compound a disconnected valence of the $CH_2=C<$ group is attached to a radical containing an amino, carbonyl, carbonitrile or chloroaryl group, e.g. 2-vinyl pyridine, 3-vinyl pyridine, 4-vinyl pyridine, 2-methyl-5-vinyl pyridine, 5-ethyl-2-vinyl pyridine, 2,4-dimethyl-6-vinyl pyridine, 2,4-diethyl-6-vinyl pyridine and dialkyl amino alkyl acrylates, e.g., 2-dimethyl amino-ethyl methacrylate and 2-dimethyl-ethyl methacrylate, dimethallyl amine, ethyl methallyl-amine, N(dimethyl amino-ethyl) methacrylamide, vinyl quinoline and dimethyl amino styrene, which contain amino groups; acrylic acid, methacrylic acid, methyl acrylate, methyl methacrylate, acrylamide and methacrylamide which contain carbonyl groups; acrylonitrile and methacrylonitrile which contain carbonitrile groups; and para chlorostyrene, dichlorostyrene (mixed isomers) and alpha methyl dichlorostyrene (mixed isomers) which contain chloroaryl groups. Examples of compounds containing a $CH_2=C<$ group but not containing an amino, carbonyl, carbonitrile or chloroaryl polar group and which may be copolymerized with such butadienes and compounds which contain a $CH_2=C<$ group and an amino, carbonyl, carbonitrile or chloroaryl polar group are styrene, alpha methyl styrene, vinyl naphthylene and vinyl toluene, e.g. in forming terpolymers of butadiene-1,3, vinyl pyridine and styrene, and butadiene-1,3, styrene and methacrylic acid. Such synthetic rubber will generally contain a major proportion (51 to 95%) of the butadiene component and a minor proportion (5 to 49%) of the component containing an amino, carbonyl, carbonitrile or chloroaryl polar group. In the preparation of such a rubber copolymer of a butadiene-1,3 with an unsaturated compound containing a polar group, the compound containing the amino, carbonyl, carbonitrile or chloroaryl polar group may be copolymerized witeh the 1,3-butadiene in aqueous emulsion to form the latex directly, or the compound containing such polar group may be graft polymerized on the rubber particles of a natural latex or of a latex prepared without such polar groups, or the solid rubber containing such polar groups may be dispersed in water with conventional emulsifying and dispersing agents to form the latex, or a solid rubber not containing such polar groups may be dispersed in water to form a latex and the compound containing such polar group graft polymerized on the rubber particles in such latex.

Additional surface-active dispersing agents to those present in the latex may be incorporated in the latex and protein and alkali-metal silicate mixture to minimize premature flocculation of the rubber as well as to facilitate the formation of the silica in very fine particulate form. Examples of such surface-active dispersing agents are anionic surface-active agents such as sodium alkyl naphthalene sulfonates, alkyl and aromatic sulfonates having an organic radical containing more than 8 carbon atoms, alkali salts of lignin and alkali salts of partially desulfonated lignin sulfonates, and non-ionic surface-active agents such as polyether alcohols, alkyl aryl ethers of polyethylene glycols and polyalkylene-glycol ethers. Up to 15 parts of such surface-active dispersing agent per 100 parts of rubber of the latex may be used. Also auxiliary flocculants, such as polyethylene polyamines (see Leukhardt et al. U.S. Patent No. 2,616,860), may be incorporated in the latex and alkali-metal silicate mixture to insure complete precipitation of the rubber and silica. Up to 5 parts of such polyethylene polyamine per 100 parts of rubber of the latex may be used. Such polyethylene polyamine may be added to the latex-silicate mixture prior to addition of the acid, or may be added with the acid, or may be added after the pH is reduced to below 7 by the acid.

The flocculation of the latex and protein and alkali-metal silicate mixture may be accomplished by adding the acid solution to the alkaline latex-protein-silicate mixture or the latex-protein-silicate mixture may be added to the acid solution. Furthermore, the latex-protein-silicate mixture may be creamed with an alkali salt, e.g. sodium chloride, prior to addition of the acid coagulating solution, as is common practice in the two step coagulation of straight synthetic rubber latex, or such alkali salt may be mixed with the acid to give a single coagulant solution. Ingredients such as carbon black, clay and other pigments, oils, rosins or other softeners, and other compounding ingredients may be included in emulsion or dispersion form and precipitated in with the rubber-silica masterbatch. In such a case the added ingredients may be simultaneously precipitated with rubber and silica or may be incorporated in the aqueous slurry of already precipitated finely divided rubber-silica composition before filtering, washing, and drying.

The masterbatches may be compounded in conventional manner with compounding and vulcanizing ingredients, and if desired additional fillers. The masterbatches either compounded or uncompounded may be treated or processed by methods known to the art prior to vulcanization. For example, they may be heated to elevated temperature, such as 375° F. before masticating, or may be masticated at low temperatures or at high temperatures, such as 375° F. before finishing and vulcanizing. Such compounds may be used in the manufacture of all types of rubber articles, such as tires, heels, soles, belting and the like.

The following examples illustrate the invention. All parts and percentages referred to herein are by weight.

Example 1

A synthetic rubber latex made by copolymerization in aqueous emulsion of a mixture of 75 parts of butadiene-1,3 and 25 parts of 2-methyl-5-vinyl pyridine polymerized at 41° C. and having a pH of 10.7 was used to prepare compounds A, B and C.

Compound A was a mixture of two batches of masterbatch prepared according to the present invention as follows: 1320 mls. (300 gms. dry wt.) of the latex was stabilized against oxidation by the addition of 22.5 mls. (4.5 gms. dry weight) of an aqueous emulsion of condensed diphenylamine acetone reaction product. To this mixture was added 150 mls. (15 gms.) dry weight of a casein solution which had been prepared by dissolving 100 grams of casein in 850 mls. of water to which had been added 50 mls. of concentrated ammonium hydroxide. To the latex casein mixture was then added 324 gms. (46.4 gms. dry wt. of $SiO_2$) of a sodium silicate solution which had been prepared by adding 162 gms. of a sodium silicate solution, which had a specific gravity of 41° Bé. and contained 8.9% $Na_2O$ and 28.65% $SiO_2$, to 162 gms. of water. This mixture was then flocculated by the addition of a 5% sulfuric acid solution (700 mls.) until the pH was 6.0. The fine crumb of masterbatch which was obtained was filtered through #4 Whatman filter paper, then reslurried in fresh water and filtered three times, then dried overnight at 50–60° C. in a forced draft oven. The total yield of the two batches was 700 grams of masterbatch.

Compound B was a mixture of two batches of masterbatch prepared with the same latex and coprecipitating with an aqueous slurry of a commercial hydrated silica reinforcing filler (Hi-Sil) by the procedure of Leukhardt et al., U.S. Patent No. 2,616,860, as follows: To a mixture of 1320 mls. (300 gms. dry weight) of the latex with 22.5 mls. (4.5 gms. dry weight) of the condensation product of diphenylamine-acetone was added a slurry of Hi-Sil which had been prepared by adding 60 gms. of dry Hi-Sil to a mixture of 3.0 mls. of tetraethylene pentamine in 340 mls. of water and the dispersion agitated 5 mins. in a 3600 r.p.m. (Waring Blendor) laboratory mixture. The mixture of latex, antioxidant and Hi-Sil were heated to 50° C. and then added with agitation to a flocculating solution which was also at 50° C. The flocculating solution was prepared by mixing 14.25 mls. of glacial acetic acid, 1.5 gms. of bone glue with water and diluting to 1500 mls. The flocculate thus obtained was filtered giving a yellow serum of pH 4.4. This was washed and dried also at 50–60° C. and the total yield of the two batches was 704 gms.

Compound C was prepared by flocculating some of the same latex stabilized against oxidation as above by a conventional salt-acid flocculation procedure and drying to obtain a rubber stock into which was mill mixed 20 parts of dry Hi-Sil per 100 parts of the rubber.

Amounts of masterbatches A and B and mill-mixed mixture C of rubber and silica containing 400 grams of rubber were further compounded on a 6″ laboratory mill with 8 grams of stearic acid, 12 grams of sulfur, 20 grams of zinc oxide, 5 grams of mercaptobenzothiazyl disulfide, 1.2 grams of tetramethylthiuram disulfide, 4 grams of 2,6-di-tert. butyl-p-cresol and 16 grams of diethylene glycol. These compounds are I, II and III respectively.

As a control for comparison with conventional rubber compounds, 600 grams of a commercial GR–S synthetic rubber copolymer of 72 parts of butadiene and 28 parts of styrene (recipe charge) were compounded with 300 grams of high abrasion furnace black (Philblack O), 6 grams of stearic acid, 12 grams of sulfur, 18 grams of zinc oxide, 1.2 grams of diphenyl guanidine and 4.2 grams of mercaptobenzothiazyl disulfide. This is compound IV.

Compounds I to IV were cured at 50 minutes and 100 minutes at 292° F. and abrasion losses were determined on cured test pieces on a modified Lambourn abrader as described in Rubber Chemistry and Technology 25, 191–208. Abrasion resistance ratings were determined from the abrasion losses using compound IV as a standard or rating control; the higher the rating figure of comparative compounds, the greater is the abrasion resistance. Results of abrasion resistance tests on compounds I to IV are shown in the following table:

| Compound Number | I | II | III | IV |
|---|---|---|---|---|
| Abrasion Loss, gms./300 ft.: | | | | |
| 50′ Cure | 0.182 | 0.369 | 0.332 | 0.290 |
| 100′ Cure | 0.192 | 0.418 | 0.370 | 0.240 |
| Abrasion Resistance Rating (percent), Average | 117 | 80 | 86 | [1] 100 |

[1] Rating control

The high degree of reinforcement with silica by the process of the present invention is shown in the higher abrasion resistance rating of compound I as compared to compounds II and III and as compared to conventional carbon black reinforced GR–S in compound IV. That the protein in the latex and alkali-metal silicate mixture before coprecipitation with acid as in the present invention is an improvement is shown by the fact that master-batches prepared by coprecipitating butadiene-1,3 and 2-methyl-5-vinyl pyridine copolymer latex without protein addition to the latex-silicate mixture gave substantially the same abrasion resistance rating with a masterbatch containing 40 parts of coprecipitated silica per 100 parts of rubber as did the masterbatch A prepared according to the present invention containing 15 parts of coprecipitated silica per 100 parts of rubber coprecipitated in the presence of casein.

*Example 2*

Two batches of masterbatch were prepared according to the present invention as follows using a butadiene-acrylonitrile copolymer latex having a pH of 9.8 which had been polymerized at 5° C. with a charge ratio of 65 parts of butadiene and 35 parts of acrylonitrile. 1080 mls. (300 gms. dry weight) of latex was stabilized against oxidation by the addition of 22.5 mls. (4.5 gms. dry wt.) of condensed diphenylamineacetone reaction product and then mixed with 900 mls. (120 gms. $SiO_2$) of a sodium silicate solution and 150 mls. (15.0 gms. dry weight) of a casein solution prepared as in Example 1. This mixture was then flocculated by addition of 1400 mls. of a 5% sulfuric acid solution, filtered, washed with water three times and dried overnight at 50–60° C. in a forced draft oven. Final pH for one batch was 5.3 and for the other batch 6.1. The total weight of the two batches was 918 grams.

A quantity of the same butadiene-acrylonitrile copolymer latex was flocculated with salt and acid in the conventional manner after stabilization with 1.5 parts of antioxidant as above, and dried. 50 parts of Hi-Sil were well mixed into 100 parts of the rubber.

Portions of the masterbatch according to the present invention and the mill-mixed rubber-silica compound containing 500 grams of the rubber were further compounded on a 6" laboratory mill with 75 grams of naphthenic oil softener, 12.5 grams of stearic acid, 12.5 grams of sulfur, 25 grams of zinc oxide, 6.25 grams of mercaptobenzothiazyl disulfide, 1.5 grams of tetramethylthiuram disulfide, 5 grams of 2,6-di-tert. butyl-p-creson and 20 grams of diethylene glycol.

In abrasion resistance tests on a Lambourn abrader on test pieces cured at 292° F. for 50 minutes, the compound from the masterbatch according to the present invention had an abrasion resistance rating of 114 as compared to a rating control of 100 for the mill-mixed Hi-Sil compound. Where casein is omitted from the butadiene-acrylonitrile copolymer rubber latex and alkali-metal silicate mixture before coprecipitating with acid, the silica and rubber precipitate as visibly separate particles which on drying and milling show discrete large silica filler particles, and which produce a cheesy vulcanizate of no value.

*Example 3*

To a latex of a terpolymer of 70 parts of butadiene-1,3 and 20 parts of styrene and 5 parts of methacrylic acid, polymerized at 50° C. under acid conditions in the presence of an acid stabilizer, $C_{12}$ to $C_{18}$ alkyl benzene sulfonate, and having a pH of 3.5 was added potassium hydroxide in amount to raise the pH to 8.5.

Two batches of masterbatch were prepared from this latex according to the present invention as follows: To 668 mls. (300 gms. dry wt.) of the latex was mixed 22.5 mls. (4.5 gms. dry weight) of an emulsion of condensed diphenylamine-acetone reaction product, 334 gms. (46.2 gms. dry weight of silica) of a sodium silicate solution and 150 mls. (15 grams dry weight) of a casein solution prepared as in Example 1. These were flocculated with 5% sulfuric acid giving for one batch a pH of 6.1 and for the other batch a pH of 5.1. These were filtered, washed three times and dried overnight at 50–60° C. The total weight of the two batches was 728 grams.

A quantity of the same butadiene-styrene-methacrylic acid terpolymer latex was salt-acid flocculated in the conventional manner after stabilization with 1.5 parts of antioxidant as above, and dried. 20 parts of Hi-Sil were mill mixed into 100 parts of the rubber.

Portions of the masterbatch according to the present invention and the mill-mixed silica compound containing 400 grams of the rubber were further compounded on a 6" laboratory mill with 8 grams of stearic acid, 8 grams of sulfur, 20 grams of zinc oxide, 5 grams of mercaptobenzothiazyl disulfide, 1.2 grams of tetramethylthiuram disulfide, 4 grams of 2,6-di-tert. butyl-p-cresol and 16 grams of diethylene glycol.

In abrasion resistance tests on a Lambourn abrader on test pieces cured at 292° F. for 50 minutes and 100 minutes, the compound from the masterbatch according to the present invention had an average abrasion resistance rating of 128 as compared to a rating control of 100 for the mill-mixed Hi-Sil compound. Where casein is omitted from the butadiene-styrene-methacrylic acid terpolymer rubber latex and alkali-metal silicate mixture before coprecipitating with acid, the silica and rubber precipitate as visibly separate particles which on drying and milling show discrete large silica filler particles, and which produce a cheesy vulcanizate of no value.

*Example 4*

That coprecipitating hydrocarbon rubber and silica from a mixture of a latex of a hydrocarbon rubber and alkali-metal silicate and protein will not give a masterbatch where the rubber is reinforced by the coprecipitated silica is shown in the following:

A synthetic ruber GR–S latex made by copolymerization in aqueous emulsion of a mixture of 72 parts of butadiene-1,3 and 28 parts of styrene at 41° C. and having a pH of 10.3 was used to prepare compounds A and B.

Compound A was a mixture of two masterbatches prepared as follows: 1260 mls. (300 gms. dry wt.) of the latex was stabilized against oxidation by the addition of 22.5 mls. (4.5 gms. dry weight) of an aqueous emulsion of condensed diphenylamine acetone reaction product. To this mixture was added 150 mls. (15 gms. dry weight) of a casein solution which had been prepared by dissolving 100 grams of casein in 850 mls. of water to which had been added 50 mls. of concentrated ammonium hydroxide. To the latex casein mixture was then added 840 gms. (120 gms. dry wt. of $SiO_2$) of a sodium silicate solution which had been prepared by adding 420 gms. of a sodium silicate solution which had a specific gravity of 41° Bé. and contained 8.9% $Na_2O$ and 28.65% $SiO_2$, to 420 mls. of water. This mixture was then flocculated by the addition of a 5% sulfuric acid solution (1500 mls.) to a pH of 6.1. The fine crumb of masterbatch which was obtained was filtered through #4 Whatman filter paper, then reslurried in fresh water and filtered three times, then dried overnight at 50–60° C. in a forced draft oven. The total yield of the two batches was 912 grams.

Compound B was prepared by flocculating some of the same latex stabilized against oxidation as above by a conventional salt-acid flocculation procedure and drying to obtain a rubber stock into which was mill mixed 50 parts of dry Hi-Sil per 100 parts of the rubber.

Amounts of masterbatch A and mill-mixed mixture B of rubber and silica containing 500 grams of rubber were further compounded on a 6" laboratory mill with 75 grams of naphthenic oil softener, 12.5 grams of stearic acid, 12.5 grams of sulfur, 25 grams of zinc oxide, 6.25 grams of mercaptobenzothiazyl disulfide, 1.5 grams of tetramethylthiuram disulfide, 5 grams of 2,6-di-tert. butyl-p-cersol and 20 grams of diethylene glycol.

As a control for comparison with conventional rubber compounds, 600 grams of a commercial GR–S synthetic rubber copolymer of 72 parts of butadiene-1,3 and 28 parts of styrene (recipe charge) were compounded with 300 grams of high abrasion furnace black (Philblack O), 6 grams of stearic acid, 12 grams of sulfur, 18 grams of zinc oxide, 1.2 grams of diphenyl guanidine and 4.2 grams of mercaptobenzothiazyl disulfide.

The compounded rubber-silica masterbatch A and rubber-silica mill-mixed mixture B and mill-mixed rubber-carbon black control were cured at 50 minutes and 100 minutes at 292° F. and abrasion losses were determined on cured test pieces on a Lambourn abrader. With the GR–S rubber-carbon black control given an average abrasion resistance rating of 100, the average abrasion resistance rating of the cured GR–S rubber-silica masterbatch was only 18 and the average abrasion resistance rating of the mill-mixed GR–S rubber and Hi-Sil mixture was only 26.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. A process which comprises incorporating an alkali-metal silicate and a protein selected from the group consisting of glue, gelatin and casein in an alkaline latex of a rubber copolymer of a butadiene-1,3 with an unsaturated compound containing a polar group selected from the class consisting of amino, carbonyl, carbonitrile and chloroaryl groups, and coagulating said rubber and forming a masterbatch therewith of coprecipitated silica in the form of filterable crumbs by mixing an acid with such latex containinig the alkali-metal silicate and protein to produce a pH of less than 7 in the aqueous medium of the coagulated synthetic rubber and coprecipitated silica at the completion of the coagulation of the masterbatch.

2. A process which comprises incorporating an alkali-metal silicate and casein in an alkaline latex of a rubber copolymer of a butadiene-1,3 with an unsaturated compound containing a polar group selected from the class consisting of amino, carbonyl, carbonitrile and chloroaryl groups, and coagulating said rubber and forming a masterbatch therewith of coprecipitated silica in the form of filterable crumbs by mixing an acid with such latex containing the alkali-metal silicate and casein to produce a pH of less than 7 in the aqueous medium of the coagulated synthetic rubber and coprecipitated silica at the completion of the coagulation of the masterbatch.

3. A process which comprises incorporating an alkali-metal silicate and a protein selected from the group consisting of glue, gelatin and casein in an alkaline latex of a rubber copolymer of a butadiene-1,3 with an unsaturated compound containing an amino group, and coagulating said rubber and forming a masterbatch therewith of coprecipitated silica in the form of filterable crumbs by mixing an acid with such latex containing the alkali-metal silicate and protein to produce a pH of less than 7 in the aqueous medium of the coagulated synthetic rubber and coprecipitated silica at the completion of the coagulation of the masterbatch.

4. A process which comprises incorporating an alkali-metal silicate and casein in an alkaline latex of a rubber copolymer of a butadiene-1,3 with an unsaturated compound containing an amino group, and coagulating said rubber and forming a masterbatch therewith of coprecipitated silica in the form of filterable crumbs by mixing an acid with such latex containing the alkali-metal silicate and casein to produce a pH of 2 to 6.5 in the aqueous medium of the coagulated synthetic rubber and coprecipitated silica at the completion of the coagulation of the masterbatch.

5. A process which comprises incorporating an alkali-metal silicate and a protein selected from the group consisting of glue, gelatin and casein in an alkaline latex of a synthetic rubber copolymer of a butadiene-1,3 and a copolymerizable compound containing a $CH_2=C<$ group where at least one of the disconnected valences is attached to a radical containing a polar group selected from the class consisting of amino, carbonyl, carbonitrile and chloroaryl groups, and coagulating said rubber and forming a masterbatch therewith of coprecipitated silica in the form of filterable crumbs by mixing an acid with such latex containing the alkali-metal silicate to produce a pH of 2 to 6.5 in the aqueous medium of the coagulated synthetic rubber and coprecipitated silica at the completion of the coagulation of the masterbatch.

6. A process which comprises incorporating an alkali-metal silicate and casein in an alkaline latex of a synthetic rubber copolymer of a butadiene-1,3 and a copolymerizable compound containing a $CH_2=C<$ group where at least one of the disconnected valences is attached to a radical containing a polar group selected from the class consisting of amino, carbonyl, carbonitrile and chloroaryl groups, and coagulating said rubber and forming a masterbatch therewith of coprecipitated silica in the form of filtrable crumbs by mixing an acid with such latex containing the alkali-metal silicate to produce a pH of 2 to 6.5 in the aqueous medium of the coagulated synthetic rubber and coprecipitated silica at the completion of the coagulation of the masterbatch.

7. A process which comprises incorporating an alkali-metal silicate and a protein selected from the group consisting of glue, gelatin and casein in an alkaline latex of a synthetic rubber copolymer of a butadiene-1,3 and a copolymerizable compound containing a $CH_2=C<$ group where at least one of the disconnected valences is attached to an amino group, and coagulating said rubber and forming a masterbatch therewith of coprecipitated silica in the form of filterable crumbs by mixing an acid with such latex containing the alkali-metal silicate to produce a pH of 2 to 6.5 in the aqueous medium of the coagulated synthetic rubber and coprecipitated silica at the completion of the coagulation of the masterbatch.

8. A process which comprises incorporating an alkali-metal silicate and casein in an alkaline latex of a synthetic rubber copolymer of a butadiene-1,3 and a vinyl pyridine, and coagulating said rubber and forming a masterbatch therewith of coprecipitated silica in the form of filterable crumbs by mixing an acid with such latex containing the alkali-metal silicate to produce a pH of 2 to 6.5 in the aqueous medium of the coagulated synthetic rubber and coprecipitated silica at the completion of the coagulation of the masterbatch.

9. A process which comprises incorporating an alkali-metal silicate and a protein selected from the group consisting of glue, gelatin and casein in an alkaline latex of a synthetic rubber copolymer of a butadiene-1,3 and 2-methyl-5-vinyl pyridine, and coagulating said rubber and forming a masterbatch therewith of coprecipitated silica in the form of filterable crumbs by mixing an acid with such latex containing the alkali-metal silicate to produce a pH of 2 to 6.5 in the aqueous medium of the coagulated synthetic rubber and coprecipitated silica at the completion of the coagulation of the masterbatch.

10. A masterbatch of a rubber copolymer of a butadiene-1,3 with an unsaturated compound containing a polar group selected from the class consisting of amino, carbonyl, carbonitrile and chloroaryl groups, and 5 to 100 parts of silica per 100 parts of said rubber, said silica and said rubber being coprecipitated in the form of filterable crumbs from a mixture of a latex of such rubber and an alkali-metal silicate in amount equivalent to 5 to 100 parts of silica per 100 parts of said rubber and a protein selected from the group consisting of glue, gelatin and casein in amount from 2 to 10 parts per 100 parts of said rubber.

11. A masterbatch of a rubber copolymer of a butadiene-1,3 with an unsaturated compound containing an amino group, and 5 to 100 parts of silica per 100 parts of said rubber, said silica and said rubber being coprecipitated in the form of filterable crumbs from a mixture of a latex of such rubber and an alkali-metal silicate in amount equivalent to 5 to 100 parts of silica per 100 parts of said rubber and a protein selected from the group consisting of glue, gelatin and casein in amount from 2 to 10 parts per 100 parts of said rubber.

12. A masterbatch of a synthetic rubber copolymer of a butadiene-1,3 and a vinyl pyridine and 5 to 100 parts of silica per 100 parts of said rubber, said silica and rubber being coprecipitated in the form of filterable crumbs from a mixture of a latex of such rubber and an alkali-metal silicate in amount equivalent to 5 to 100 parts per 100 parts of said rubber and a protein selected from the group consisting of glue, gelatin and casein in amount from 2 to 10 parts per 100 parts of said rubber.

13. A masterbatch of a synthetic rubber copolymer of a butadiene-1,3 and 2-methyl-5-vinyl pyridine and 5 to 100 parts of silica per 100 parts of said rubber, said silica and rubber being coprecipitated in the form of filterable crumbs from a mixture of a latex of such rubber and an alkali-metal silicate in amount equivalent to 5 to 100 parts per 100 parts of said rubber and casein in amount from 2 to 10 parts per 100 parts of said rubber.

References Cited in the file of this patent

UNITED STATES PATENTS

| | | |
|---|---|---|
| 2,450,578 | Brown | Oct. 5, 1948 |
| 2,616,860 | Leukhardt et al. | Nov. 4, 1952 |
| 2,649,388 | Wills et al. | Aug. 18, 1953 |